(12) United States Patent
Mohler et al.

(10) Patent No.: US 7,443,767 B2
(45) Date of Patent: Oct. 28, 2008

(54) APPARATUS AND METHOD FOR UPDATING A SCHEDULE

(75) Inventors: Bridget Marie Mohler, Arvada, CO (US); David Scott Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1009 days.

(21) Appl. No.: 10/339,049

(22) Filed: Jan. 9, 2003

(65) Prior Publication Data

US 2004/0136274 A1 Jul. 15, 2004

(51) Int. Cl.
*G04B 19/22* (2006.01)
(52) U.S. Cl. .......................................... 368/21; 368/47
(58) Field of Classification Search .................. 368/21, 368/46, 47, 244, 246, 250, 10; 705/1; 455/502, 455/550; 715/780
See application file for complete search history.

(56) References Cited

U.S. PATENT DOCUMENTS

| | | | | |
|---|---|---|---|---|
| 5,960,406 | A * | 9/1999 | Rasansky et al. | 705/9 |
| 6,198,696 | B1 * | 3/2001 | Korpi et al. | 368/21 |
| 6,434,381 | B1 * | 8/2002 | Moore et al. | 455/414.3 |
| 6,496,116 | B2 * | 12/2002 | Farringdon et al. | 340/573.1 |
| 6,587,398 | B1 * | 7/2003 | Mock et al. | 368/21 |
| 6,647,370 | B1 * | 11/2003 | Fu et al. | 705/8 |
| 2002/0098857 | A1 * | 7/2002 | Ishii | 455/502 |
| 2003/0054325 | A1 * | 3/2003 | Miller et al. | 434/108 |
| 2003/0088427 | A1 * | 5/2003 | Elsey et al. | 705/1 |

* cited by examiner

*Primary Examiner*—Vit W. Mikska
*Assistant Examiner*—Jeanne-Marguerite Goodwin
(74) *Attorney, Agent, or Firm*—John C. Moran

(57) ABSTRACT

Allowing an electronic schedule to be automatically updated by a device with the time zone where the device is presently located.

8 Claims, 5 Drawing Sheets

APPARATUS AND METHOD FOR UPDATING A SCHEDULE

TECHNICAL FIELD

This invention relates to automatically updating a schedule by an electronic device.

BACKGROUND OF THE INVENTION

A variety of electronic devices currently allow a user to maintain an electronic schedule. Such devices consist of personal computers (PC), personal digital assistants (PDA), and wireless telephones/pagers. The problem that is faced by a frequent traveler who has a significant number of meetings on a multi-leg trip, which involves the movement through a number of time zones, is to remember to manually update their electronic schedule before the trip starts and during the trip. The need in the prior art to manually update the electronic schedule either by performing this operation for each event or adjusting the time zone information is a major problem.

Within the prior art, it is known to synchronous a scheduler maintained on a central server with the time zone of the server's location. This allows an individual in another time zone who is setting up a meeting via the participants' schedulers to automatically have the meeting time reflected on participants' schedulers in accordance with the time zones where the servers maintaining those various schedulers are located. Whereas, this prior art solution works well as long as the participants are in the same locations as their servers, it causes confusion when one or more of the participants are traveling. The traveler has to remember this fact and must also remember to mentally correct any verbal meeting time information received from other participants who may be in other time zones. A similar problem accords with respect to email transmission times that also reflect the time zone of the server being used for the email. The recipient of the email must remember that the email transmission time is that of the email server and not the time of day of the traveler's location.

SUMMARY OF THE INVENTION

The foregoing problems are solved and a technical advance is achieved by allowing an electronic schedule to be automatically updated by a device with the time zone where the device is presently located.

DETAILED DESCRIPTION

Figure 1:
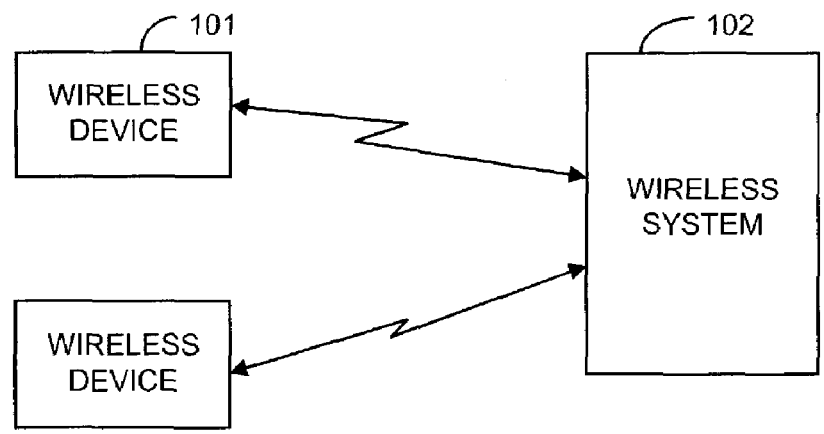
FIG. 1 illustrates an embodiment of a wireless system for implementing the invention.
Figure 2:
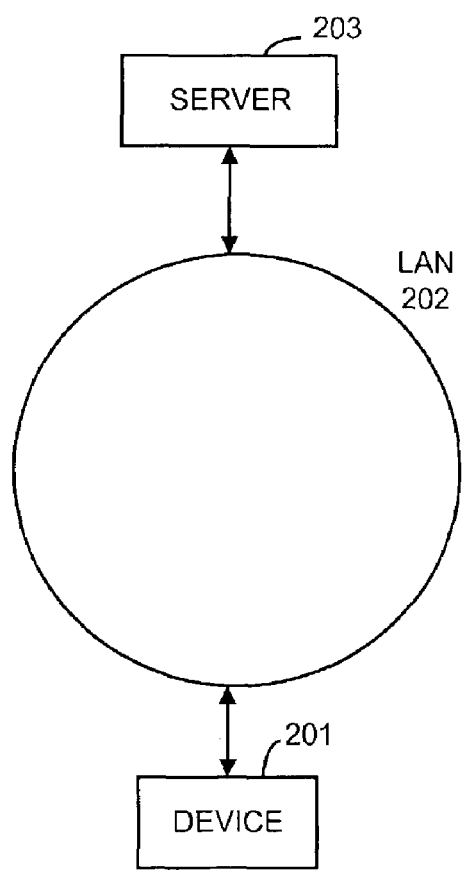
FIG. 2 illustrates an embodiment of a wired system for implementing the invention.

FIG. 1 illustrates wireless device 101 establishing wireless communication with wireless system 102. When this wireless connection is established, wireless system 102 transmits to device 101 timing information. This timing information defines the time of day as well as the time zone. Similarly, FIG. 2 illustrates device 201 establishing a wired connection to local area network (LAN) 202. Once this connection is established, server 203 transmits to device 201 timing information. One skilled in the art would readily realize that LAN 202 could also be a variety of wired switching systems such as a circuit switching system, an ATM switching system, a packet switching system, or a wide area network. One skilled in the art would readily realize that wireless system 102 could be a variety of systems including a cellular system or a wireless network for data. One skilled in the art would also realize that device 101 or 201 could be a variety of devices such as personal computer, personal digital assistant, pager, or wireless telephone.

In one embodiment of the invention, the device establishes contact with an external time source and determines if the time of day from this external source is different than the time of day within the device. If there is a difference, the user is given the opportunity to accept this new time of day for updating the electronic schedule. In another embodiment, the user can not only accept the new time of day but determine a period of time over which this new time will be utilized. In another embodiment, the user is given the opportunity to utilize a travel itinerary that is stored in electronic form within the device to update the electronic schedule. In another embodiment, the user is allowed to switch between the local time as determined by the external time source or to utilize the time specified by the travel itinerary.

To better understand the various embodiments, consider the following example. In this example device 101 is a wireless PDA that a traveler is utilizing to maintain their electronic schedule. The traveler arrives at a location in a different time zone other than that currently being used by device 101. Upon establishing wireless contact with wireless system 102, device 101 receives from wireless system 102 timing information defining the time of day and the time zone. Device 101 is responsive to this timing information and displays to the user the new timing information indicating the time and time zone change, giving the user the ability to accept the utilization of this new timing information in the user's electronic schedule.

In addition, an alternate embodiment of device 101 allows the user to specify a period of time during which the new timing information will be utilized. For example, the user may only intend to remain in the new location for a day. The user would indicate that the new timing information should be utilized in the electronic schedule for one day only. This allows the user to examine their other events occurring outside the one day with the timing information that was initially recorded for these events. In addition, the user can choose to ignore the new timing information and not to alter the time shown on the electronic schedule.

The user can also create an electronic traveling itinerary. This will define the times that the user will be in various locations along with the time zone information. Device 101 can utilize this travel itinerary to automatically update the electronic schedule for the period of times covered by the itinerary. Note the user can manually override the electronic schedule defined by the itinerary or choose to override it utilizing timing information received from an external time source.

Figure 3:
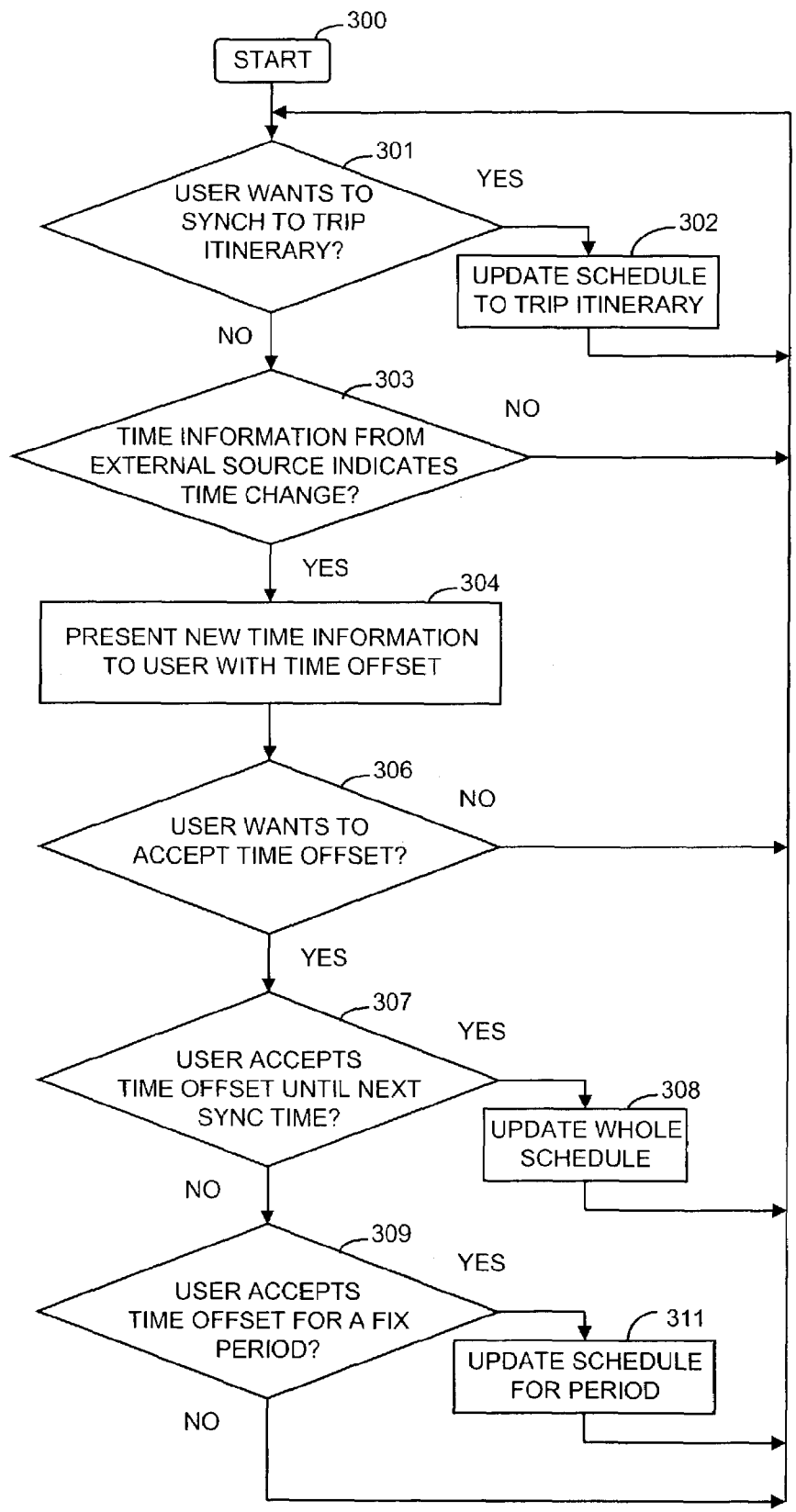
FIG. 3 illustrates, in flowchart form, operations performed by an embodiment of the invention.

FIG. 3 illustrates, in flowchart form, operations performed by an embodiment in implementing the invention. Once started from block 300, decision block 301 determines if the user wants to synchronous their electronic schedule to a trip itinerary. If the answer is yes, block 302 updates the electronic schedule in accordance with the trip itinerary before transferring control back to decision block 301.

If the answer in decision block 301 is no, decision block 303 determines if there has been timing information received from an external source that indicates a time change. If the answer is no in decision block 303, control is transferred back to decision block 301. If the answer is yes in decision block 303, block 304 presents the new timing information to the user showing the time offset between the present time and the new timing information received from the external source as well as the new time zone. Advantageously, the external source could be a wireless system or a wired network switching system. After execution of block 304, control is transferred to decision block 306. The latter decision block determines if the user wants to accept the time offset for purposes of updating the electronic schedule. If the answer is no, control is transferred back to decision block 301.

If the answer in decision block 306 is yes, decision block 307 determines if the user wants to accept the time offset until the next sync time which would be the next contact with another external timing source. If the answer is yes, block 308 updates the whole electronic schedule before returning control back to decision block 301. If the answer is no in decision block 307, decision block 309 determines if the user wants to accept the time offset for a fixed period of time. If the answer is yes, block 311 updates the electronic schedule for this fixed period of time before returning control back to decision block 301. If the answer in decision block 309 is no, control is returned to decision block 301.

Figure 4:
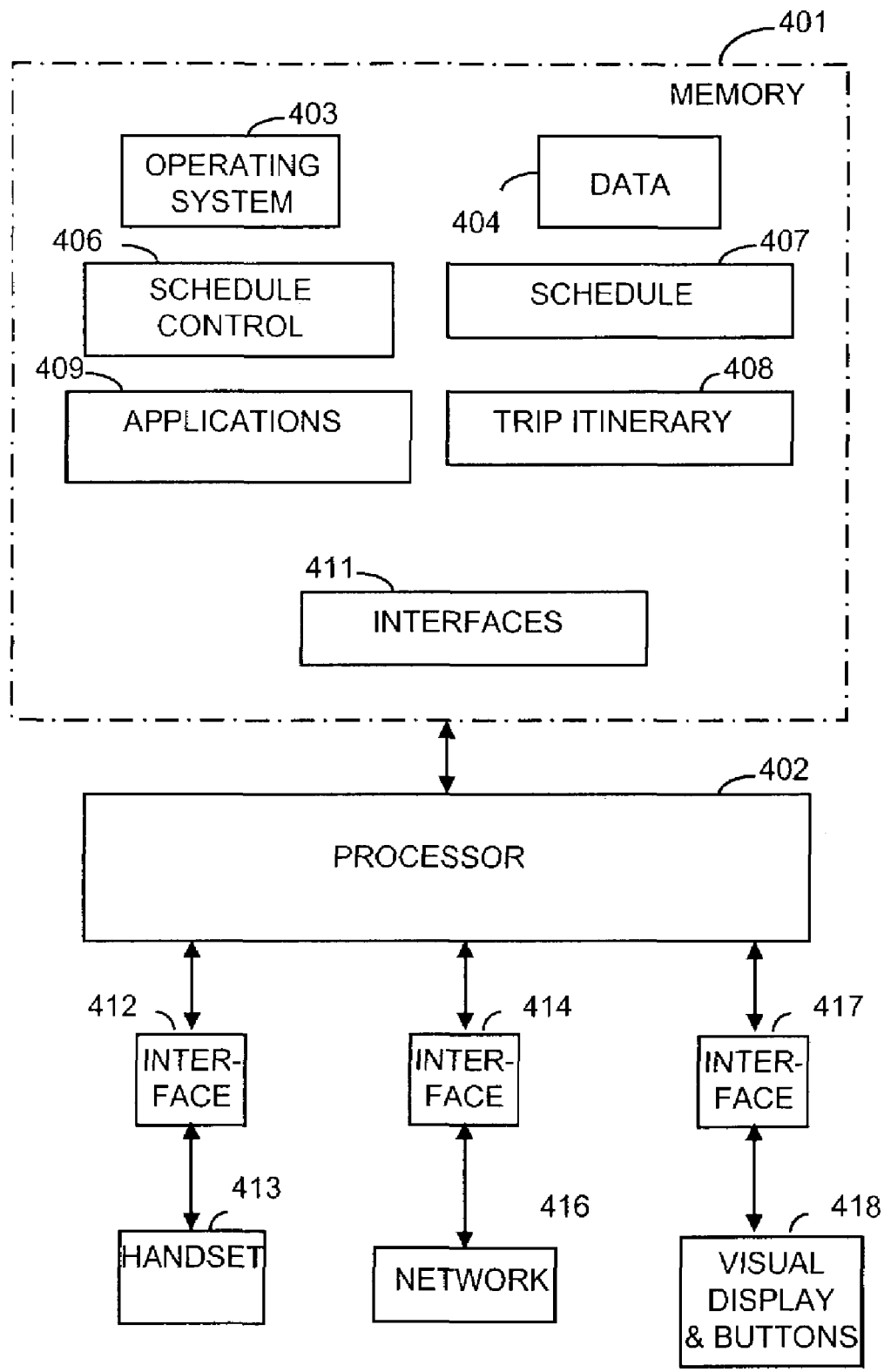
FIG. 4 illustrates, in block diagram form, an embodiment of a device in accordance with the invention.

FIG. 4 illustrates, in block diagram form, an embodiment of a device which may be device 101 of FIG. 1 or device 201 of FIG. 2. Blocks 412 and 413 will only be present if the device is a wireless telephone or performing the functions of a wireless telephone. Interface 414 interfaces the device to network 416. Network 416 may be wireless system 102 of FIG. 1 or LAN 202 of FIG. 2. Interface 414 would be a wireless interface for wireless system 102 or a wired interface for FIG. 2. Processor 402 provides overall control of the interfaces and utilizes visual display and buttons 418 to receive and communicate information to the user. In one embodiment, processor 402 executes programs out of memory 401. Operating system 403 provides overall control of the device. Applications 409 provide the operations that are normally provided for this type of device. For example, if the device were a wireless telephone, applications 409 would provide the functions of a wireless telephone. Schedule control 406 provides the control for performing the operations illustrated in FIG. 3. Schedule 407 is the electronic schedule, and trip itinerary 408 is a listing of a trip itinerary. Data 404 is utilized for various forms of data. Interface routine 411 is utilized to control interface 412, 414, and 417.

Figure 5:
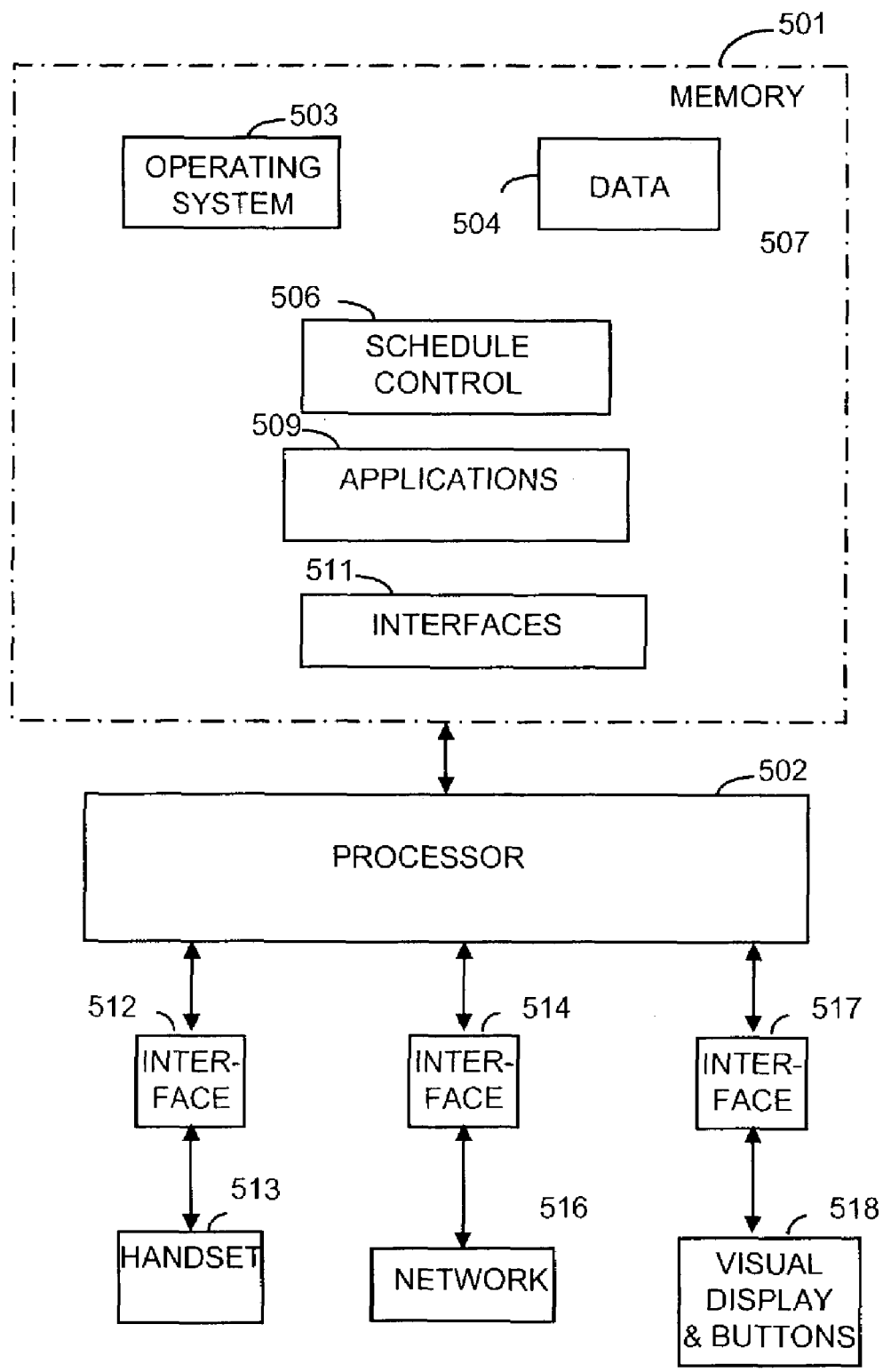
FIG. 5 illustrates, in block diagram form, another embodiment of a device in accordance with the invention.
Figure 6:
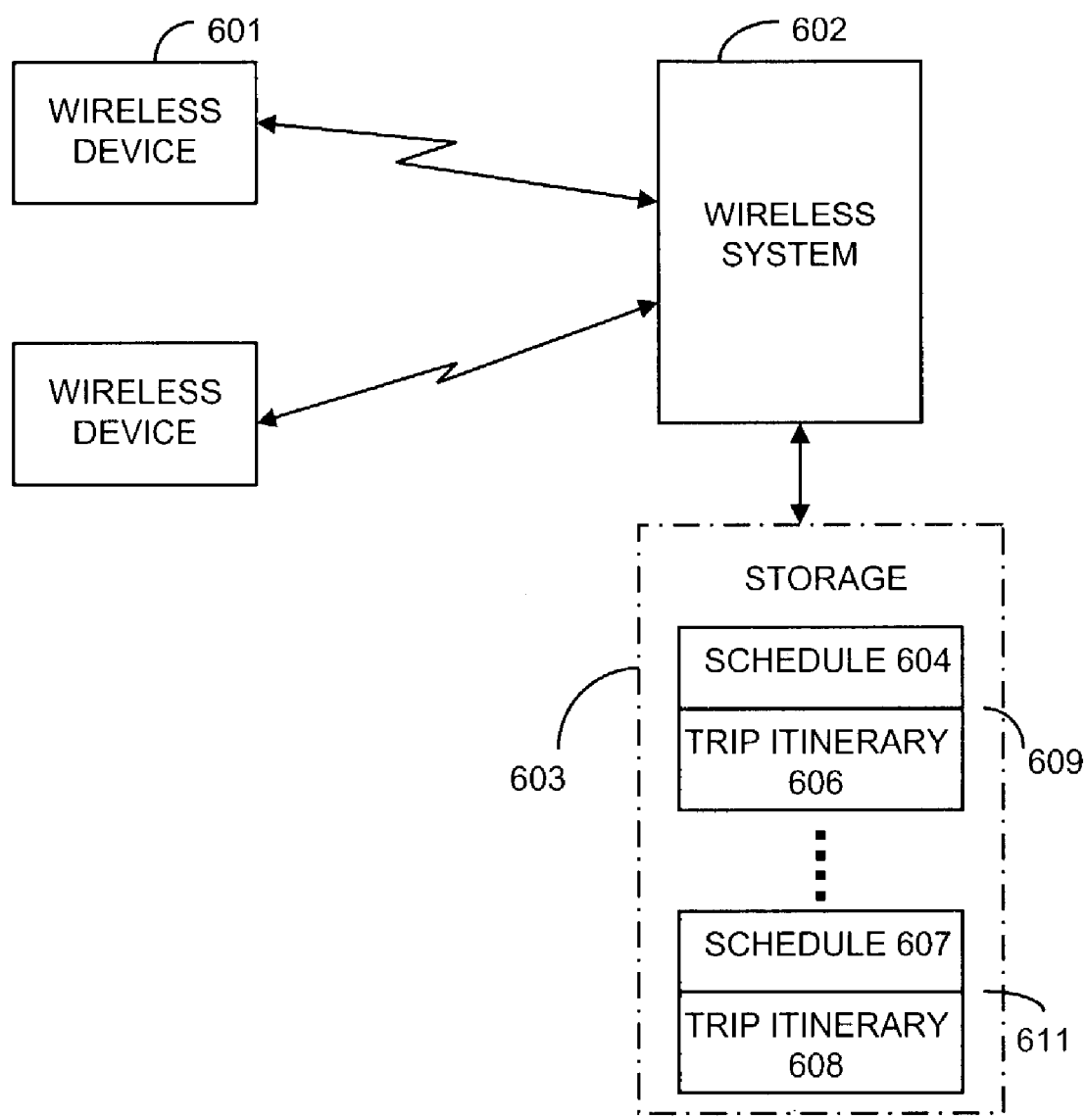
FIG. 6 illustrates another embodiment of a wireless system for implementing the invention.

FIG. 5 illustrates, in block diagram form, another embodiment of a device which may be device 601 of FIG. 6. This device has limited memory capacity and stores its schedule and trip itinerary in storage 603. Blocks 512 and 513 will only be present if the device is a wireless telephone or performing the functions of a wireless telephone. Interface 514 interfaces the device to network 516. Network 516 may be wireless system 602 of FIG. 6. Interface 514 would be a wireless interface for wireless system 602. Processor 502 provides overall control of the interfaces and utilizes visual display and buttons 518 to receive and communicate information to the user. Interface routine 511 is utilized to control interface 512, 514, and 517. In one embodiment, processor 502 executes programs out of memory 501. Operating system 503 provides overall control of the device. Applications 509 provide the operations that are normally provided for this type of device. For example, if the device were a wireless telephone, applications 509 would provide the functions of a wireless telephone. Schedule control 506 provides the control for performing the operations illustrated in FIG. 3 by using schedule 604 and trip itinerary 606 stored in storage 603 of FIG. 6. Schedule control 506 accesses schedule 604 and trip itinerary 606 stored in storage 603 via wireless system 602 in order to perform the operations of FIG. 3. Information concerning schedule 604 and trip itinerary 606 is displayed to the user of device 601 via the visual display & buttons 518. Data 504 is utilized for various forms of data including information accessed from schedule 604 and trip itinerary 606.

FIG. 6 illustrates another embodiment of a wireless system. Upon receiving a request from a wireless device, wireless system 602 can access storage 603. Storage 603 stores a plurality of schedule and trip itinerary pairs 609-611 with each pair being associated with a device of limited memory capacity such as the device illustrated in FIG. 5.

In an alternative embodiment of FIG. 2, server 203 can store schedule and trip itinerary pairs for use by devices such as the one illustrated in FIG. 5.

When the operations of devices 101, 201, or 601 are implemented in software, as is shown in FIG. 3, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. Device 101 or 201 can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured via optical scanning of the paper or other medium and then compiled, interpreted or otherwise processed in a suitable manner, if necessary, and stored in a computer memory.

In an alternative embodiment, where device 101 or 201 is implemented in hardware, device 101 or 201 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modification to the illustrated embodiments described above will be apparent to those skilled in the art. Such changes and modifications can be made without departing from the spirit and scope of the invention and without diminishing its intended advantages. It is therefore intended that such changes and modifications be covered by the following claims except insofar as limited by the prior art.

What is claimed is:

1. A method for updating an electronic schedule by a device, comprising the steps of:
   connecting to least one of a group consisting of a telecommunication switching system or a data switching system by the device upon arriving at a new location wherein the group consisting of a telecommunication switching system or a data switching system is in a same time zone as the device;
   receiving time zone information from at least one of a group consisting of the telecommunication switching system or the data switching system by the device wherein the received time zone information is the time zone in which the at least one of a group consisting of the telecommunication switching system or the data switching system is located;
   comparing a present time zone in use by the device with the received time zone information to detect a time zone change;
   notifying a user of the device of the time zone change by the device; and
   allowing the user to determine if the electronic schedule will be adjusted for the time zone change by limiting the adjustment of the electronic schedule to only a time period of the electronic schedule whereby the remainder of the electronic schedule not in the time period is not effected.

2. The method of claim 1 wherein the step of limiting comprises the step of allowing the user to determine the time period.

3. The method of claim 1 further comprises the steps of storing an electronic trip itinerary in the device;
   periodically checking the electronic trip itinerary for a time zone change; and
   updating the electronic schedule to reflect the time zone change based on the step, of checking.

4. The method of claim 1 further comprises the steps of storing an electronic trip itinerary in storage remote from the device whereby the electronic trip itinerary is only present in storage remote from the device;
   periodically checking the electronic trip itinerary for a time zone change; and
   updating the electronic schedule to reflect the time zone change based on the step of checking.

5. A processor-readable medium comprising processor-executable instructions stored in a device configured for:
   connecting to least one of a group consisting of a telecommunication switching system or a data switching system by the device upon arriving at a new location wherein the group consisting of a telecommunication switching system or a data switching system is in a same time zone as the device;
   receiving time zone information from at least one of a group consisting of the telecommunication switching system or the data switching system by the device wherein the received time zone information is the time zone in which the at least one of a group consisting of the telecommunication switching system or the data switching system is located;
   comparing a present time zone in use by the device with the received time zone information to detect a time zone change;
   notifying a user of the device of the time zone change by the device; and
   allowing the user to determine if the electronic schedule will be adjusted for the time zone change by limiting the adjustment of the electronic schedule to only a time period of the electronic schedule whereby the remainder of the electronic schedule not in the time period is not effected.

6. The processor-readable medium of claim 5 wherein the limiting comprises allowing the user to determine the time period.

7. The processor-readable medium of claim 5 further comprises storing an electronic trip itinerary in the device;
   periodically checking the electronic trip itinerary for a time zone change; and
   updating the electronic schedule to reflect the time zone chance based on the step of checking.

8. The processor-readable medium of claim 5 further comprises storing an electronic trip itinerary in storage remote from the device;
   periodically checking the electronic trip itinerary for a time zone change; and
   updating the electronic schedule to reflect the time zone change based on the step of checking.

* * * * *